United States Patent [19]

Thye-Lokenberg

[11] 4,387,666

[45] Jun. 14, 1983

[54] PIG BOX GRATING

[76] Inventor: Heinrich Thye-Lokenberg, D-2845 Neuenkirchen i.Old., Fed. Rep. of Germany

[21] Appl. No.: 263,951

[22] Filed: May 15, 1981

Related U.S. Application Data

[63] Continuation of Ser. No. 75,632, Sep. 14, 1979, abandoned.

[30] Foreign Application Priority Data

Sep. 16, 1978 [DE] Fed. Rep. of Germany ....... 2840395
Jun. 23, 1979 [DE] Fed. Rep. of Germany ....... 2925464

[51] Int. Cl.³ .............................................. A01K 1/02
[52] U.S. Cl. .................................................. 119/28
[58] Field of Search ............................... 119/28, 20, 16

[56] References Cited

U.S. PATENT DOCUMENTS

| | | | |
|---|---|---|---|
| 492,777 | 5/1893 | Buchanan, Jr. | 119/28 |
| 3,181,503 | 5/1965 | Tripp | 119/28 X |
| 3,826,230 | 7/1974 | Jones et al. | 119/28 |
| 3,905,334 | 9/1975 | Stevenson | 119/28 X |
| 3,921,350 | 11/1975 | Van Schoyck | 119/28 |

FOREIGN PATENT DOCUMENTS 2300501 10/1976 France .................................. 119/28

*Primary Examiner*—Hugh R. Chamblee
*Attorney, Agent, or Firm*—William A. Drucker

[57] ABSTRACT

A slotted grating is used for forming bases for boxes for suckling sows and piglets, and is of the kind having larger apertures in the areas in which the sows are kept, and smaller apertures in the areas in which the piglets are kept, said apertures serving for discharging excrement and urine. The improvement of the invention is that the slotted grating consists of a structural element provided along the length of the box with groups of different apertures respectively of rectangular or round shape, the rectangles or the round holes within each group having the same slot width or diameter, the rectangular apertures or round holes differing in slot width or diameter from group to group.

10 Claims, 14 Drawing Figures

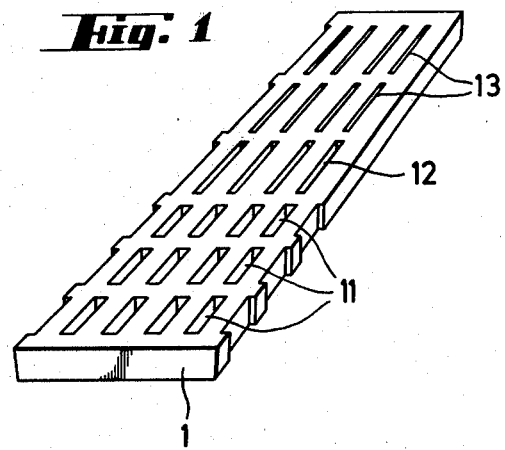
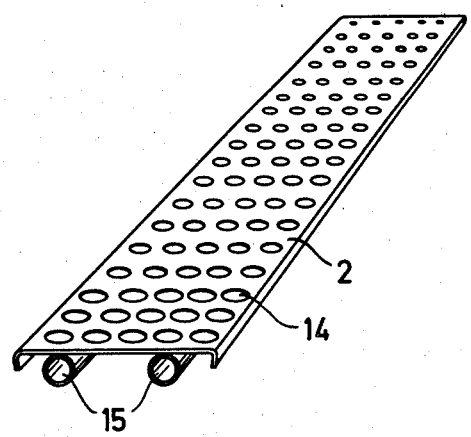
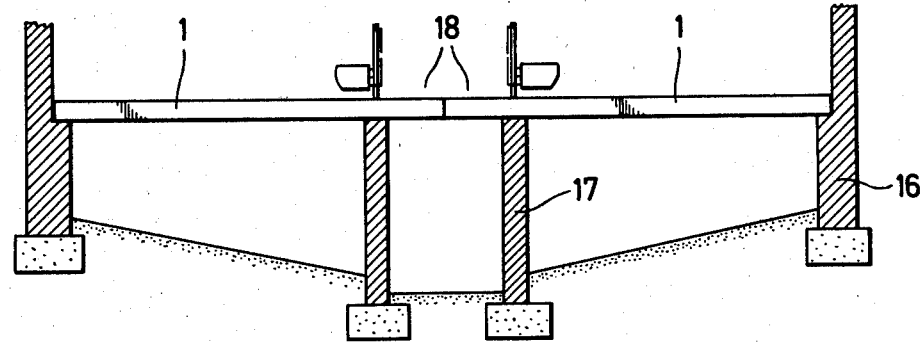

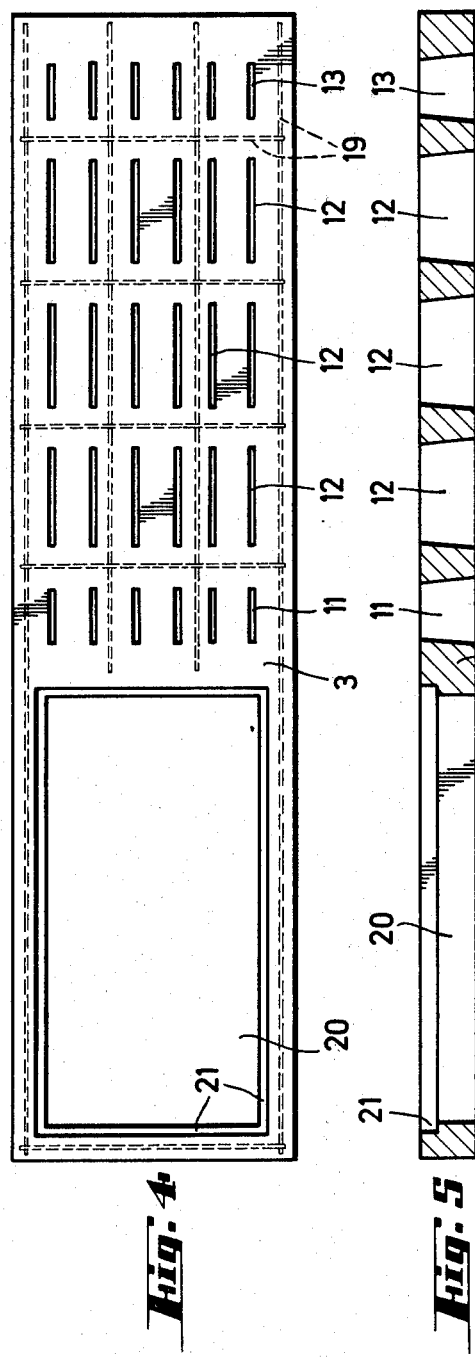
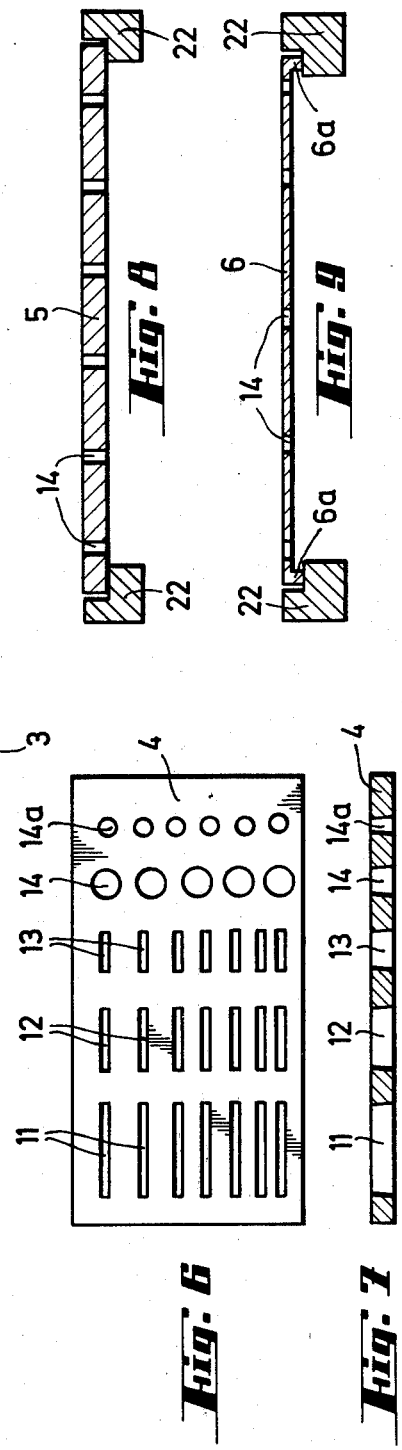

4,387,666

PIG BOX GRATING

This is a continuation of Ser. No. 075,632 filed Sept. 14, 1979 now abandoned.

BACKGROUND OF THE INVENTION

This invention relates to slotted bases for use as flooring in pigsties, and in particular a slotted grating for bases in boxes, for suckling sows, into which the sow can be placed prior to farrowing.

With box bases for suckling sows it is essential that the place in which the piglets are kept, and the box section to the rear of the sow, have slots of different widths through which the excrement and urine can pass. The slots in the flooring must be of a width which makes it impossible for the animals' legs to become trapped. This leads to small widths inside the boxes in which the piglets are kept. On the other hand, larger slots are required in the box to the rear of the sow, because a greater amount of excrement and urine is dropped and has to pass through at this point.

THE PRIOR ART

Boxes for suckling sows have already been provided with slotted bases in the box section in which the piglets are kept, the slots being of a width which is regarded as standard for piglets.

The rear section of the box, where the excrement and urine passed by the sow collects, has been fitted with a floor section with a specially enlarged outlet. Because the grating, consisting of longitudinal sections, must be supported at both ends, it is necessary to fit a third longitudinal structural element which serves as a passage from the slotted base to the grating, in particular with rows of boxes. This not only represents additional expenditure, but also requires additional consideration in connection with the under-floor discharge of the excrement and urine. It is the usual practice, in particular for rows of boxes, to channel the excrement and urine into the lower under-floor section and then discharge it collectively from this point. The third longitudinal structural element interrupts this flow.

OBJECT OF THE INVENTION

The object of this invention is to provide a simple, low cost and economical method for producing slotted bases, in boxes for suckling sows, which will form a slotted grating which is on the one hand adapted to the living conditions of both animal age groups and which provides a safe environment for the piglets and permits adequate discharge facilities for excrement and urine, leaving the standing and resting areas free from dirt, and which on the other hand can be constructed from durable and versatile materials.

SUMMARY OF THE INVENTION

In accordance with this invention, this problem is solved by the structure set out in claim 1 appended hereto, the features set out in the appendent sub-claims representing further favorable improvements.

The slotted grating which is the subject of this invention can be manufactured simply and at low cost and may consist of one or several concrete and/or metal parts, of cast metal, plastics material, wood or similar materials and can be economically fitted into pigsties, permitting in addition a choice of material or respectively the use of a combination of materials for the slotted grating.

A preferred embodiment of this invention is a slotted grating which consists of a removable metal, wooden or plastics element which is placed inside the concrete element.

It is of further advantage to cover the walking surface of the slotted grating with a protective coating of plastics or rubber, which both provides a non-skid surface and furthermore protects the grating against aggressive materials contained in the excrement and urine, to ensure that the animals are protected against injury and furthermore that the grating has an excellent durability.

The fitting of the slotted grating is extremely simple and speedy, as the slotted gratings can be manufactured in various sizes.

The slotted grating is of a favorable design and is provided with slotted or round apertures in the section in which the sows and piglets are kept, the apertures being adapted to the living conditions of both animal age groups and making it impossible for the piglets to be injured or become trapped, so that an extremely suitable standing and resting area is created.

The apertures guarantee an unobstructed discharge of the excrement and urine and dispense with cleaning operations, etc.; in addition they ensure that the animals are kept in a clean and hygienic environment.

Preferred embodiments of the invention are hereinafter described with reference to the accompanying drawings.

BRIEF DESCRIPTION OF THE DRAWINGS

In the drawings:

FIG. 1 is a perspective view of a slotted grating with groups of slots arranged in a longitudinal direction of the box, the slots being of various widths and the grating consisting of a concrete element;

FIG. 2 is a perspective view of a slotted grating consisting of a metal casting with groups of round apertures of various sizes and with longitudinal piping for heating purposes;

FIG. 3 is a schematic diagram showing a cross-section of a pigsty with two rows of boxes and a dividing passage;

FIG. 4 is a plan view of a slotted grating made from concrete and having an opening for insertion of a slotted grating made from cast metal;

FIG. 5 is a longitudinal view through the slotted grating in accordance with FIG. 4;

FIG. 6 is a plan view of the insertable slotted grating;

FIG. 7 is a longitudinal view through the slotted grating in accordance with FIG. 6;

FIGS. 8 and 9 are cross-sections through two slotted gratings of different design which have been placed on graduated beams;

DESCRIPTION OF THE PREFERRED EMBODIMENTS

Figure 10:
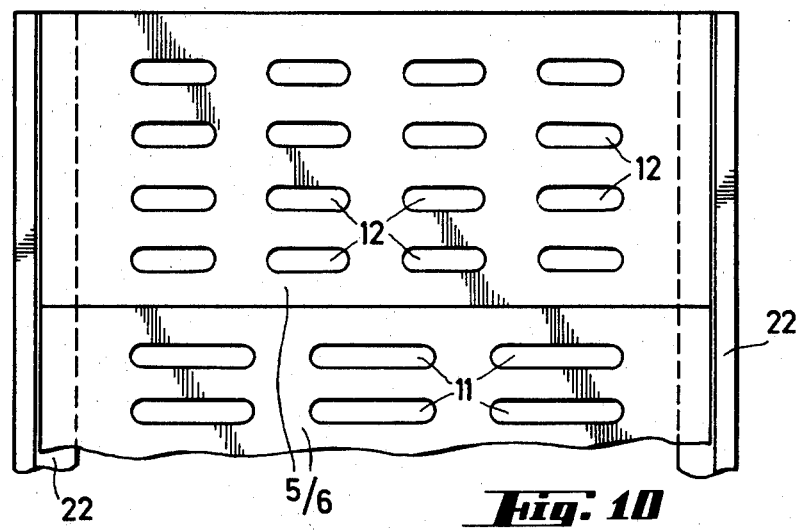
FIG. 10 is a plan view of slotted gratings which have been placed on graduated beams.

The slotted grating 1 to 8 which is the subject of this invention and serves to form the bases of boxes for suckling sows and piglets consists of one or several structural elements which may be manufactured from concrete and/or cast metal and/or plastics and/or metal and/or wood and be provided if necessary with a non-skid surface layer 9,10.

The slotted grating 1 to 8 has apertures 11 to 14 for discharging excrement and urine, the apertures in the areas in which the sows are kept having a larger diameter than those in the areas in which the piglets are kept.

Viewed in a longitudinal direction of the box, the structural element 1 to 8 is provided with groups of various apertures 11,12,13,14/14a, which are designed as rectangular holes 11,12,13 or round holes 14,14a, the rectangular holes 11,12,13 and the round holes 14,14a, within each group, being of identical diameter and slot width, varying however in slot width and diameter in relation to every other group.

It is preferred to provide a group of apertures 11/14 of identical size (slot width and diameter) in the area in which the sows are kept, and one or several groups of apertures 12, 12/14a, of different sizes (slot width and diameter) in the area in which the piglets are kept.

Reference is now made to the embodiment shown in FIG. 1. Here the structural element 1 is designed as a concrete element, which may be of a length of approximately 2 meters. The size of the slot width and round holes may vary between 3 and 30 millimeters.

In FIG. 1 the rear section of the structural element 1 is provided with slots 13 as apertures of minimum slot width, followed by one or several groups of slots 12 which may be of the same width as slots 13, which have however been shown in a slightly enlarged form for the purpose of illustrating a first improvement of the invention. For instance: slots 13 may be 6 millimeters wide, slots 12 may be 9 millimeters wide; both widths are regarded as standard for piglets. The front section of the concrete element 1 is provided with groups of slots 11 having a width which is regarded as standard for pregnant sows.

The width of slots 11 was intentionally made larger than the initial range of slot widths for heavy sows would indicate; the width ma vary between 20 and 30 millimeters, i.e. it may be 24 millimeters. This ensures that the new-born piglets are protected even more effectively against becoming trapped and are better able to free themselves until they have developed enough sense of danger to avoid this box section.

The rectangular slots 11,12,13 may be rounded off at their longitudinal ends and do not necessarily have to be provided with parallel longitudinal walls.

In accordance with a further embodiment to FIG. 2, a slotted grating may be similar in design to a perforated sheet. Such a construction is not only simpler than the slotted design but also dispenses with the need for apertures to be arranged in regular and straight lines. FIG. 2 shows holes 14, instead of slots, which are grouped together across the structural element 2, which consists of a single steel sheet, into groups of holes 14 of increasing diameter or into groups of an increasing number of holes 14. This also leads to an increase of the overall aperture 14 area at that end of the grating 2 away from the area which the piglets prefer. A variation of the group formation for the apertures 14 across the width of the grating is also possible.

Where the grating consists of a concrete element 1 it is possible to instal electrical heating element (not shown).

Where the grating consists of a steel casting in accordance with FIG. 2, it is possible to support the grating 2 with pipe runners 15 which may be connected to a heating circuit.

Where a pigsty is constructed in accordance with the schematic diagram shown in FIG. 3, the slotted gratings 1 are arranged adjacent to each other on the longitudinal support structures 16 and 17, running in the longitudinal direction of the pigsty, and are then divided into boxes in the usual manner. FIG. 3 shows the slotted gratings with extensions 18 which cover the dividing passage between the two box rows, this representing a further improvement of this invention.

The covering required for a dividing passage between two rows of boxes in the form of an extension 18 may form part of the slotted grating 1/2. This type of construction includes the two longitudinal support structures usually required where half the passage width is moulded onto the grating. In this case one type of slotted grating will suffice for the overall structure. Where the whole of the gang width is moulded on, the slotted gratings are on one side of the passage or alternating in the longitudinal direction of the pigsty staggered at both sides. In the former case, it is possible to save one of the longitudinal support elements; in the latter case, a slot in the center of the passage is avoided. In both cases, two types of slotted gratings are required for the overall structure.

Reference is now made to the embodiment shown in FIGS. 4 to 7. This slotted grating is divided into two sections. It consists of one concrete slotted grating 3 and one removable slotted grating 4 which is inserted into the same and may consist of cast metal, plastics, wood, or other suitable material. The concrete slotted grating 3 is fitted with reinforcements 19 and is provided on one section of its length with one or several groups of slots 11,12,13 and has a rectangular or square cutout 20 in one of its end sections, a groove 21 running along the tread area of this cutout. The slotted grating 4, consisting of a sheet made from cast steel (aluminum, cast iron, malleable cast iron, spheroidal graphite iron, steel cast) is inserted into this groove 21, the upper side of the slotted grating 4 being level with the tread area of the slotted grating 3. This casting 4 has, for instance, a thickness of 3 centimeters, and the groove 21 is adapted to this thickness. The casting 4 provides for one or several groups of slots of either rectangular shape, 11,12,13, or round shape 14,14a.

It is preferred that the slotted grating 3,4, consisting of two sections, be made from concrete or cast metal. The slotted grating 4 may however also consist of an alternative material.

In accordance with the design features shown in FIGS. 8 to 10 there is shown a slotted grating 5,6 made from cast metal, which is placed on two graduated beams 22. In accordance with the features of FIG. 8, the slotted grating 5 comes in the form of a sheet having the same thickness across its whole area and the slotted grating 6 shown in FIG. 9 comes in the form of a thinner plate or sheet which is provided with angular edges 6a pointing downwards for positioning on the graduated beams 22.

The box base may consist of several plates 5,6, which may vary in length between 2 and 2.20 meters, in width between approximately 40 centimeters and 1 meter, the preferred size being 50 centimeters.

Figure 13:
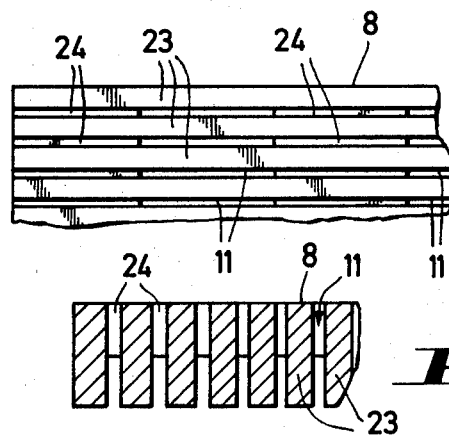
FIG. 13 is a plan view of a slotted grating consisting of a welded flat iron element.
Figure 14:
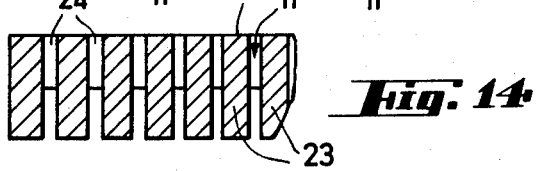
FIG. 14 is a cross-section through the slotted grating in accordance with FIG. 13.

FIGS. 13 and 14 show a slotted grating 8 which consists of several pieces of flat iron 23 and interspaced spreaders 24 which have been welded together. The flat iron 23 has been arranged in an upright position and the interspaced spreaders 24 consist of thin sheets of metal and produce the required slot width.

The same method may be applied for constructing a wooden slotted grating.

In addition it is also possible to form the slotted grating from a wire material (not shown).

Figure 11:
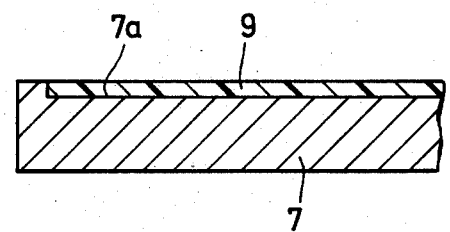
FIGS. 11 and 12 are cross-sections through sections of slotted gratings with a non-skid surface layer.

In order to give the concrete or cast metal slotted gratings a secure tread area for the sows and piglets, the upper side of the slotted gratings 7 may be covered with a layer 9,10 of plastics or rubber. In accordance with FIG. 11 the slotted grating 7 has an indentation at the top end which extends into the vicinity of the surrounding edge, into which the covering layer 9 is placed, for instance; this layer is either cast into this indentation by the manufacturer, or in the case of foil, plate or sheet or a similar material is glued into position.

Figure 12:
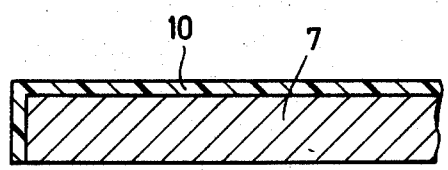

The embodiment shown in FIG. 12 shows the covering layer 10 extending along the upper side and across the outer edge forming the grating height and is thus in practice pulled across the grating 7 like a hood, and the covering layer 10 may be cast or glued on.

The covering layer 9,10 forms a non-skid surface and offers protection against damage and disintegration of the grating material which may be caused by the aggressive materials contained in the excrement and urine passed by the sow and piglets.

I claim:

1. A base for resting on spaced supports for the accommodation of suckling sows and piglets, comprising a plurality of grids each made in one piece, said grids each including a plurality of apertures spaced from each other along the entire length and width thereof, the apertures being arranged in at least three groups distributed in the lengthwise direction of the grids, the width of all of the apertures within each group being the same for that group, the width of the apertures of each group being different from the width of the apertures of each other group, the grid having apertures of relatively larger width within the range 20 to 30 millimeters in the location of the base to be occupied by sows so that faeces and urine can readily pass through the grid apertures, the grid having apertures of relatively lesser width in two groups in the location of the base to be occupied by piglets, a first of said groups of the piglet location having an aperture width of about 6 millimeters, and a second of the said groups of the piglet location having an aperture width of about 9 millimeters.

2. A base, as claimed in claim 1, made of concrete.

3. A base, as claimed in claim 1, made of metal.

4. A base, as claimed in claim 1, wherein said apertures are rectangular with rounded ends, a single group of said apertures of relatively larger width being disposed in the location of the base to be occupied by sows, at least two groups of apertures of respectively different widths being disposed in the location of the base to be occupied by piglets.

5. A base, as claimed in claim 1, wherein said apertures are round holes, a single group of said apertures of relatively larger width being disposed in the location of the base to be occupied by sows, at least two groups of apertures of respectively different widths being disposed in the location of the base to be occupied by piglets.

6. A base, as claimed in claim 1, wherein said grids further comprise a covering of non-slip resistant material on that surface of the grid on which the sows and piglets stand.

7. A base, as claimed in claim 1, wherein the aperture width in the location to be occupied by the sows is about 24 millimeters.

8. A base, as claimed in claim 1, further comprising means for the application of heating.

9. A base, as claimed in claim 8, wherein said means comprise electrical heating means incorporated in the grids.

10. A base, as claimed in claim 8, wherein said means comprise piping attached to said grids for the passage of heating fluid.

* * * * *